(12) United States Patent
Beeckman et al.

(10) Patent No.: US 7,553,790 B2
(45) Date of Patent: Jun. 30, 2009

(54) ENHANCED CRYSTAL ACIDITY EXCHANGE METHOD

(75) Inventors: Jean W. Beeckman, Columbia, MD (US); Glenn R. Sweeten, East Stroudsburg, PA (US); Daria N. Lissy, Glen Mills, PA (US); David L. Stern, Baton Rouge, LA (US); Stephen J. McCarthy, Center Valley, PA (US); Dominick N. Mazzone, Wenonah, NJ (US); Christine N. Elia, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 608 days.

(21) Appl. No.: 11/258,440

(22) Filed: Oct. 25, 2005

(65) Prior Publication Data

US 2006/0122053 A1    Jun. 8, 2006

Related U.S. Application Data

(60) Provisional application No. 60/633,938, filed on Dec. 7, 2004.

(51) Int. Cl.
*B01J 29/06* (2006.01)
(52) U.S. Cl. .............................. 502/60; 502/64; 502/85
(58) Field of Classification Search .................. 502/60, 502/64, 85
See application file for complete search history.

(56) References Cited

U.S. PATENT DOCUMENTS

| 3,686,343 | A | * | 8/1972 | Bearden et al. | ............. 585/828 |
| 4,069,172 | A | * | 1/1978 | Kanaoka et al. | ............... 502/68 |
| 4,265,788 | A | * | 5/1981 | Ebitani et al. | ................. 502/79 |

OTHER PUBLICATIONS

Occelli et al., "The effects of Na ions on the properties of calcined rare-earth Y (CREY) zeolites", Applied Catalysis A : General 183 (1999) 53-99, no month.*

* cited by examiner

*Primary Examiner*—Elizabeth D Wood
(74) *Attorney, Agent, or Firm*—P. E. Purwin; L. Montalvo

(57) ABSTRACT

The present invention describes a method to increase the activity of a catalyst by first performing an ion exchange step with a potassium ion, followed by performing an ion-exchange step with an ammonium ion. Specifically, the present invention describes a method to increase the acidity of a zeolite by incorporating a potassium salt ion-exchange prior to an ammonium salt ion-exchange step. Even more specifically, the present invention is drawn to a method of increasing the activity of a zeolite by employing more than one potassium ion exchanges followed by at least one ammonium ion exchange. The present invention also describes a method to reduce the amount of sodium normally found in commercially produced zeolite by employing any of these methods. The present invention is also drawn to the catalysts produced by any of these methods.

7 Claims, 1 Drawing Sheet

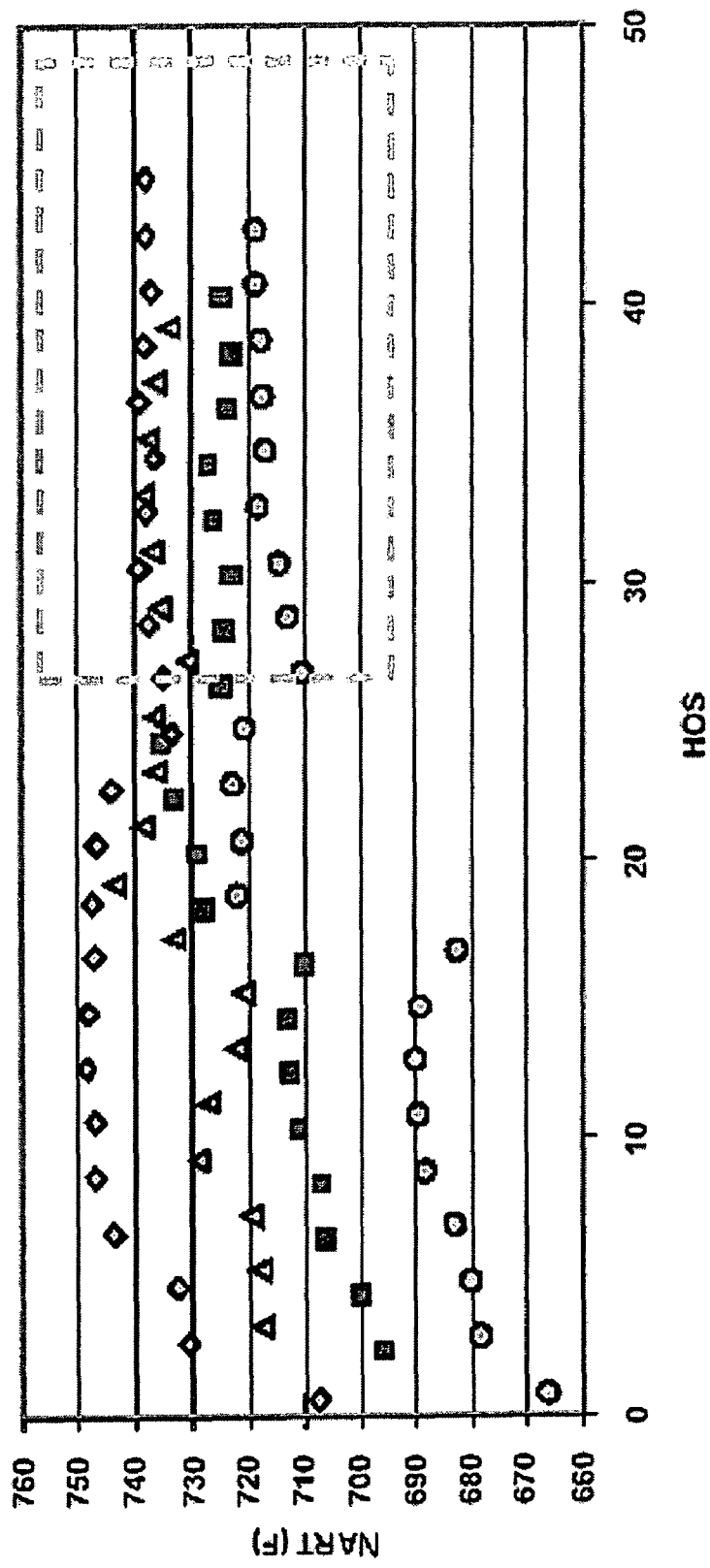

ENHANCED CRYSTAL ACIDITY EXCHANGE METHOD

This application claims the benefit of U.S. Provisional Application No. 60/633,938 filed Dec. 7, 2004.

BACKGROUND OF THE INVENTION

Microporous materials, including zeolites and silicoaluminophosphates, are widely used in the petroleum industry as absorbents, catalysts and catalyst supports. Their crystalline structures consist of three-dimensional frameworks containing uniform pore openings, channels and internal cages of dimensions (<20 Å) similar to most hydrocarbons. The composition of the frameworks can be such that they are anionic, which requires the presence of non-framework cations to balance the negative charge. These non-framework cations, such as alkali or alkaline earth metal cations, are exchangeable, either entirely or partially with another type of cation utilizing ion exchange techniques in a conventional manner. If these non-framework cations are converted to the proton form by, for example, acid treatments or exchange with ammonium cations followed by calcination to remove the ammonia, it imparts the material with Bronsted acid sites having catalytic activity. The combination of acidity and restricted pore openings gives these materials catalytic properties unavailable with other materials due to their ability to exclude or restrict some of the products, reactants, and/or transition states in many reactions.

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by unit structure of the crystal. The zeolites are sometimes referred to as "molecular sieves" because interconnecting channel systems created by pores of uniform pore size allow a zeolite to selectively absorb molecules of certain dimensions and shapes By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula:

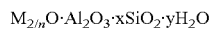

$$M_{2/n}O \cdot Al_2O_3 \cdot xSiO_2 \cdot yH_2O$$

In this empirical formula, x is equal to or greater than 2, since AlO4 tetrahedra are joined only to SiO4 tetrahedra, and n is the valence of the cation as designated in M. D. Breck, ZEOLITE MOLECULAR SIEVES, John Wiley & Sons, New York p. 5 (1974). In the empirical formula, the ratio of the total of silicon and aluminum atoms to oxygen atoms is 1:2. M was described therein to be sodium, potassium, magnesium, calcium, strontium and/or barium, which complete the electrovalence makeup of the empirical formula.

The prior art describes a variety of synthetic zeolites. These zeolites have come to be designated by letter or other convenient symbols, as illustrated by zeolite A (U.S. Pat. No. 2,882,243); zeolite beta (U.S. Pat. No. 3,308,069 and RE 28341); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979) and zeolite ZSM-23 (U.S. Pat. No. 4,076,842), merely to name a few.

The silicon/aluminum atomic ratio of a given zeolite is often variable. For example, zeolite X can be synthesized with silicon/aluminum atomic ratios of from 1 to 1.5, while that ratio in zeolite Y is from 1.5 to 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871, reissued as RE. 29,948, discloses a porous crystalline silicate made from a reaction mixture containing no deliberately added aluminum and exhibiting the X-ray diffraction pattern characteristic of ZSM-5 zeolites.

Moreover, the silicon/aluminum atomic ratio of the "as-synthesized" zeolite can be altered, specifically increased, by decreasing the tetrahedral aluminum thereof. Decrease in the tetrahedral aluminum may be affected by synthetic methods developed to deplete the tetrahedral aluminum of a zeolite. In addition, the silicon:aluminum atomic ratio of a zeolite may be increased, that is there may be a loss of tetrahedral aluminum, as a result of process conditions to which the zeolite may be subjected during use. Process conditions which will effect depletion of tetrahedral aluminum include high temperature calcination and steaming. This loss of aluminum does not affect the crystallinity of zeolites, such as ZSM-5.

Those zeolites of practical significance today are not only characterized by uniform pore sizes, but also by channel systems created by those pores. To maintain activity of a zeolite, the crystallographic structure of the zeolite after chemical treatment must remain intact.

The electrovalence of the tetrahedra containing aluminum is balanced by the inclusion in the crystal of a cation, for example an alkali metal, an alkaline earth metal or an organic cation. This can be expressed wherein the ratio of aluminum to the number of various cations, such as Ca/2, Sr/2, Na, K or Li, is equal to unity. One type of cation may be exchanged entirely or partially with another type of cation utilizing ion exchange techniques in a conventional manner. By means of such cation exchange, it has been possible to vary the properties of a given aluminosilicate by suitable selection of the cation. The cavities and pores are occupied by molecules of water prior to dehydration and/or possibly by organic species from the synthesis mixture in the as-synthesized materials.

Numerous methods have been developed to increase the activity of catalysts. Zeolite acid activity can be increased by various means such as mild steaming, hydrothermal treatment in the presence of aluminum, and vapor phase treatment with aluminum chloride. Various chemical treatments of zeolites have been proposed to modify their chemical properties and increase catalyst activity. U.S. Pat. No. 4,444,900 teaches a technique to wash the catalyst with dilute hydrofluoric acid to de-te the catalyst in order to increase the sites for ion exchange. U.S. Pat. No. 6,124,228 teaches a standard method of increasing catalyst activity by performing an ion exchange with an ammonium salt followed by calcination. The '228 patent also teaches using potassium nitrate as opposed to an ammonium salt. U.S. Pat. No. 6,207,042, which also mentions that potassium nitrate may be used as an ion-exchange step, teaches that this will actually reduce the acidity (and thus activity) of the catalyst. The activated or acidified form of the zeolite is often referred to as the H-zeolite, H-form zeolite or the proton form of the zeolite.

U.S. Pat. No. 4,265,788 teaches simultaneously using both an ammonium nitrate and potassium nitrate ion-exchange procedure. However, the '788 patent teaches nothing concerning increasing the activity of a catalyst; rather it teaches a procedure to leave the potassium ion in the zeolite's channels allowing for the selective separation of para-xylene from other $C_8$ aromatic hydrocarbons. The inventors are not aware of any prior art that teaches an ion-exchange first with a potassium ion, followed by an ion-exchange with an ammonium ion to increase catalytic activity of a zeolite.

The sodium content of a catalyst also has been shown to be important to the catalyst's activity. U.S. Pat. No. 6,207,042 teaches that activity and anti-fouling improvements can be achieved by removing as little as an additional 0.1 wt % sodium from the catalyst matrix. The manufacture of commercial catalysts often leaves substantial quantities of sodium in the crystal to offset the aluminum charge deficiency compared to the silica. The sodium is commercially exchanged out of the crystal with ammonium nitrate producing the well-known H-form of the zeolite after calcination. Depending on the particular zeolite, however, fairly large quantities of sodium remain in the crystal, negatively affecting the activity of the H-form.

While previous patents have taught ion exchange methods using ammonium salts or potassium salts, the inventors have unexpectedly found that a serial ion exchange, first by one or more exchanges with a potassium salt, followed by one or more exchanges with an ammonium salt dramatically reduces sodium content and increases catalyst acidity and activity.

SUMMARY OF THE INVENTION

In one aspect, the present invention describes a method to increase the activity of a catalyst by first performing at least one ion exchange step with a potassium ion, followed by performing at least one ion-exchange step with an ammonium ion. Specifically, the present invention describes a method to increase the acidity of a zeolite by incorporating a potassium salt ion-exchange prior to an ammonium salt ion-exchange step. Even more specifically, the present invention is drawn to a method of increasing the activity of a zeolite by employing more than one potassium ion exchanges followed by at least one ammonium ion exchange. The present invention also describes a method to reduce the amount of sodium normally found in commercially produced zeolites by employing any of these methods. The present invention is also drawn to the catalysts produced by any of these methods.

BRIEF DESCRIPTION OF THE DRAWINGS

FIG. 1 is a graphical representation of the Normalized Average Reactor Temperature ("NART") (in ° F.) versus the Hours on Stream for four catalysts.

DETAILED DESCRIPTION OF THE INVENTION

Zeolitic materials, both natural and synthetic, have been demonstrated in the past to have catalytic capabilities for various types of hydrocarbon conversion. including the cracking of carbon-carbon bonds, alkene isomerization and polymerization, aromatic alkylation with alkenes or alcohols, transalkylation, and other acid-catalyzed reactions. The cracking of alkanic bonds requires the highest activity; alkene transformations require lower catalytic strength and/or lower temperature.

Certain zeolitic materials are amorphous and the catalysts were not shape selective. Other zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these cavities or pores are such as to accept for adsorption molecules of certain dimensions while rejecting those of larger dimensions, these materials have come to be known as "molecular sieves" and are utilized in a variety of ways to take advantage of these properties. The present invention increases the activity of both amorphous materials and ordered zeolites.

In one aspect, the present invention is a method to increase the activity of a catalyst comprising:
1. treating said catalyst with a potassium salt solution, followed by
2. treating said catalyst with an ammonium salt solution
3. calcining said catalyst For the purposes of this disclosure, treating means to contact the catalyst with a fluid or solution used for the ion-exchange. While the actual amount of time allowed for ion exchange may vary, the inventors recommend, but do not require, that the nominal length of time for each treating should be sufficient to allow the ion-exchange to approach equilibrium. In the Examples below, the ammonium-sodium equilibrium was achieved in about one hour of treating. However, one of ordinary skill in the art understands that this time period may vary with the initial strength of the ion-exchange solution, the initial amount of ions to be exchanged in the catalyst matrix, the method of contacting the solution with the catalyst (e.g. agitation, still settling, circulation of the solution over or through the catalyst, etc.) and the temperature of the wash, among other well-known factors. Intermediate or intervening calcining steps may be performed without altering the nature of the present invention.

In a non-limiting embodiment, the catalysts used with the present invention may be zeolites, which may be, but are not limited to, ZSM-5, ZSM-11, ZSM-22, ZSM-23, ZSM-34, ZSM-35, ZSM-38, ZSM-48, ZSM-50, ZSM-57, MCM-22, MCM-49, silicalite-1, silicalite-2, CHA, ERI, MAZ, OFF, RHO, HEV, KFI, LEV, and LTA structure type zeolites (IUPAC Commission of Zeolite Nomenclature), ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho.

In another non-limiting embodiment of the present invention, the treating process may include additional treatings with a potassium ion or salt. In a further non-limiting embodiment, a calcination or "hybrid calcination step" may proceed or follow any of the ammonium treating steps. A hybrid calcination step is used when the catalyst has some amount of organic matter (usually the template) retained. The organic matter is (at least partially) decomposed in nitrogen as many organic templates are not stable at high temperatures. Hybrid calcination involves first removing the decomposition products in a non-oxygen environment, followed by calcination in an environment that may include oxygen.

In a non-limiting example, hybrid calcination involves heating the catalyst in nitrogen at approximately 2° C. per minute to approximately 200-760° C., preferably 375-600° C., even more preferably 430-550° C., holding for about 1 hour, immediately followed by a calcination in pure nitrogen or full air, or a combination of the two, at approximately 200-820° C., preferably 425-650° C., even more preferably 480-600° C. for approximately 1-100 hours. Regular calcination, which is well known in the art, may be employed in cases where the template is present at low levers or no template was used. The only limiting factors for either hybrid calcination or regular calcination is that the catalyst is stable at the calcination temperature and the calcination proceeds for a sufficient time to remove the template and dry the catalyst.

In another non-limiting example, the present invention is directed to enhancing the activity of a zeolite catalyst comprising of the following steps in order:

1. treating said catalyst with a first potassium salt solution,
2. decanting said first potassium salt solution from said catalyst,
3. treating said catalyst with a second potassium salt solution,
4. decanting said second potassium salt solution from said catalyst,
5. treating said catalyst with a third potassium salt solution,
6. decanting said third potassium salt solution from said catalyst,
7. performing a hybrid calcination upon said catalyst,
8. treating said catalyst with an ammonium salt solution,
9. decanting said ammonium salt solution from said catalyst,
10. calcining said catalyst.

The inventors created three types of green (sometimes also known as "raw", "dried-only" or "as-formulated") catalysts to test in various regimens, each regimen intended to increase the green catalysts' activities. Each of the three green catalysts were comprised of 65% by weight ZSM-5 zeolite combined with 35% $SiO_2$ binder, but the source of the silica for crystallization and/or the source of the silica for binder were varied. The silica sources are commercially available and are herein referred to as silica-regular and silica-modified. ZSM-5 is well known in the art and may be produced as described in U.S. Pat. No. 3,702,886, U.S. Pat. No. 6,180,550, U.S. Pat. No. 6,504,075 or U.S. Pat. No. 6,800,272, which are hereby incorporated by reference, or by any of the many other processes reported to produce the zeolite known as ZSM-5.

The first green ZSM-5 zeolite was crystallized with the Silica-regular as the source of silica for the crystallization of the ZSM-5 and the Silica-regular as the silica source for the binder of the catalyst; it is hereinafter known as the Reg/Reg catalyst. The second zeolite was crystallized with the Silica-modified as the source of silica for the crystallization of the ZSM-5 and the Silica-regular as the silica source for the binder; it is hereinafter known as the Mod/Reg catalyst. Finally, the third zeolite was crystallized with the Silica-modified as the source of silica for the crystallization of the ZSM-5 and the Silica-modified as the silica source for the binder material, hereinafter known as the Mod/Mod catalyst.

EXAMPLE 1

The inventors determined the sodium content and the Alpha activity of the green catalysts. The sodium content was determined using an internal method. However, since the present invention teaches a method to reduce the sodium content of a catalyst (as opposed to an absolute measure of the sodium content), any standard measure of catalyst sodium content will prove the efficacy of the present invention. The "alpha activity" of a catalyst is an approximate indication of the catalytic cracking activity of the catalyst compared to a standard catalyst, and it gives the relative rate constant (for normal hexane conversion per volume of catalyst per unit time). It is based on the activity of the amorphous silica-aluminum cracking catalyst taken as an alpha of 1 (Rate Constant=0.016 sec.sup.−1). The alpha test is described in U.S. Pat. No. 3,354,078 and in the Journal of Catalysis, 4, 522-529 (1965); 6, 278 (1966); and 61, 395 (1980), each incorporated herein by reference. It is noted that intrinsic rate constants for many acid-catalyzed reactions are proportional to the alpha value for a particular crystalline silicate catalyst (see "The Active Site of Acidic Aluminosilicate Catalysts," Nature, 309, No. 5959, 589-591, (1984), hereby incorporated by reference. The experimental conditions of the test used herein include a constant temperature of 538° C. and a variable flow rate as described in detail in the Journal of Catalysis, 61, 395 (1980). The catalyst in the present invention preferably has an alpha value greater than 1, for example, from about 1 to about 2000. The alpha value of the catalyst may be increased by initially treating the catalyst with nitric acid or by mild steaming before pre-selectivation. This type of steaming is discussed in U.S. Pat. No. 4,326,994, herein incorporated by reference.

Two Alpha tests were run on each of the Mod/Reg and the Mod/Mod while the Reg/Reg only had one test run. The results are reported in Table 1.

TABLE 1

| Catalyst | Na (ppm) | Average Alpha |
| --- | --- | --- |
| Reg/Reg | <500 | 330 |
| Mod/Reg | 315 | 340 |
| Mod/Mod | 399 | 295 |

The inventors investigated two known and three new ion-exchange/activation regimens to determine which, if any, improved the activity of catalysts. The first two, Regimens A and B, are standard industry activation methods. Regimens C, C-Hot and D were created by the inventors as candidate regimens that might improve activity.

For Regimen A, the green catalyst is pre-calcined in nitrogen at about 480° C. This pre-calcined catalyst was then loaded into a column and humidified by passing moist air through the catalyst bed. The catalyst was then ammonium exchanged at ambient temperature by circulating a 1N ammonium nitrate solution through the catalyst bed for approximately one hour and then the solution was removed from the catalyst. This ammonium exchange procedure was repeated for two additional times. Finally, the catalyst was rinsed with distilled water and dried at approximately 120° C. followed by calcination in full air at approximately 540° C. for approximately 6 hours.

For Regimen B, the green catalyst was loaded into a column and humidified by passing moist air through the catalyst bed. The catalyst was then ammonium exchanged at ambient temperature by circulating a 1N ammonium nitrate solution through the catalyst bed for approximately one hour and then the solution was drained from the column. This ammonium exchange procedure was repeated for two additional times. The catalyst was rinsed with distilled water and dried at approximately 120° C. followed by a hybrid calcination. Hybrid calcination is calcining the catalyst in nitrogen at approximately 480° C. followed by calcination in full air at approximately 540° C. for 6 hours.

For Regimen C, the green catalyst was loaded into a column and humidified by passing moist air through the catalyst bed. The catalyst was then ammonium exchanged at ambient temperature by circulating a 1N ammonium nitrate solution through the catalyst bed for approximately one hour and then the solution was drained from the column. The catalyst was rinsed with distilled water and dried at approximately 120° C. followed by calcining in nitrogen at approximately 480° C. The catalyst was then humidified and the ammonium exchange was repeated two additional times by circulating a 1N ammonium nitrate solution through the catalyst bed for approximately one hour. The catalyst was then rinsed with distilled water and hybrid calcined. Hybrid calcination is calcining the catalyst in nitrogen at approximately 480° C. followed by calcination in full air at approximately 540° C. for 6 hours.

The inventors also employed a regimen known as Regimen C-Hot, which followed the same procedure as in Regimen C but the ion exchanges were performed at 70° C.

For Regimen D, the green catalyst was loaded into a column and humidified by passing moist air through the catalyst bed. The catalyst was then potassium exchanged at ambient temperature by circulating a 1N potassium nitrate solution through the catalyst bed for approximately one hour and then the solution was drained from the column. This potassium exchange procedure was repeated two additional times. The catalyst was then rinsed with distilled water and dried at approximately 120° C. followed by a hybrid calcination. The catalyst was then loaded into a column and humidified by passing moist air over the catalyst. The catalyst was then ammonium exchanged at ambient temperature by circulating a 1N ammonium nitrate solution through the catalyst bed for approximately one hour and then the solution was drained from the column. The catalyst was rinsed with distilled water and dried at approximately 120° C. followed by calcining in full air at approximately 540° C.

EXAMPLE 2

The inventors performed all 5 Regimens on the Mod/Reg catalyst and then analyzed for sodium content and Alpha activity in the same manner as in Example 1. The results are presented in Table 2.

TABLE 2

| | Catalyst Mod/Reg | |
|---|---|---|
| | Na (ppm) | Average Alpha |
| Regimen A | 770 | 430 |
| Regimen B | 315 | 330 |
| Regimen C | <50 | 705 |
| Regimen C-Hot | <50 | 400 |
| Regimen D | <50 | 570 |

The inventors noted that both Regimen C and Regimen D produced superior results when compared to the standard industry regimens A and B. The inventors were surprised to note that Regimen C-Hot actually produced poorer results than Regimen C because they had expected ion exchange to be more pronounced at a higher exchange temperature.

EXAMPLE 3

The inventors performed 4 of the 5 Regimens on the Mod/Mod catalyst and then analyzed for sodium content and Alpha activity in the same manner as in Example 1. The Regimen C-Hot was not performed because the experiments of Example 2 demonstrated that it would not produce uniformly higher activity for all catalysts. The results are presented in Table 3.

TABLE 3

| | Catalyst Mod/Mod | |
|---|---|---|
| | Na (ppm) | Average Alpha |
| Regimen A | 687 | 280 |
| Regimen B | 399 | 295 |
| Regimen C | 128 | 370 |
| Regimen C-Hot | * | * |
| Regimen D | <50 | 520 |

The inventors noted that while Regimen C did perform better in the Alpha activity test than the industry standards, its increase in Alpha activity was modest, only increasing activity by 25% over that of the green catalyst. However, the inventors also noted that Regimen D produced consistently high increases of Alpha activity, showing improvements of 68% over the green catalyst activity in the Mod/Reg case and of 76% over the green catalyst activity in the Mod/Mod case.

EXAMPLE 4

The inventors performed a second type of activity measurement, known as the Normalized Average Reactor Temperature (hereinafter NART) to verify that Regimen D was superior to Regimen C or B. To measure NART, a catalyst is evaluated under standard toluene disproportionation (TDP) conditions, whereby toluene is reacted over a catalyst to form benzene and xylene. Two grams of the catalysts sample was mixed with quartz sand to make a catalyst bed of 7 grams and charged to a tubular reactor. The NART test conditions have a Weight Hourly Space Velocity of 3, and $H_2$:HC ratio of 1, and the pressure was maintained at approximately 270 psig (1.86 MPa). The initial reactor temperature is 750° F. (398.9° C.). The temperature is adjusted to achieve 30% Toluene conversion with a product analysis of the total effluent being made every two hours with an online GC. The lower the reactor operating temperature, the higher the catalytic activity. The NART test was evaluated for four catalysts:
1. Reg/Reg activated by Regimen B
2. Mod/Mod activated by Regimen B
3. Mod/Mod activated by Regimen C
4. Mod/Mod activated by Regimen D The results are shown in FIG. 1.

FIG. 1 clearly shows that Regimen D far outperformed Regimens B and C on the Mod/Mod catalyst and that the Mod/Mod catalyst under Regimen D was superior to the standard industry catalyst exchanged and calcined under standard industry models (Reg/Reg activated by Regimen B).

The present invention is also a method to effectively reduce the sodium content of a catalyst. The data from Tables 2 and 3 clearly show that Regimen D reduces the level of sodium in the catalyst far superior to Regimens A and B, and better than Regimen C for at least some catalysts. Therefore, any of the disclosed embodiments within this specification may also be used as a method to reduce the amount of sodium within a catalyst as opposed to necessarily increasing the activity of the catalyst.

What is claimed is:

1. A method to improve the properties of a ZSM-5 zeolite catalyst consisting essentially of the following steps in order:
   a. treating said catalyst with a first potassium salt solution,
   b. decanting said first potassium salt solution from said catalyst,
   c. treating said catalyst with a second potassium salt solution,
   d. decanting said second potassium salt solution from said catalyst,
   e. treating said catalyst with a third potassium salt solution,
   f. decanting said third potassium salt solution from said catalyst,
   g. performing a hybrid calcination upon said catalyst wherein the catalyst is subjected to a first heat treatment in a nitrogen atmosphere at a temperature of about 200 to 760° C., then held at that temperature for about 1 hour, followed by a second heat treatment at a temperature of about 200 to about 820° C. for a period of about 1 hour to about 100 hours in an atmosphere selected from the group consisting of: aa) substantially pure nitrogen, bb) substantially all air, and cc) a combination of substantially pure nitrogen and air, h. treating said hybrid calcined catalyst with an ammonium salt solution, i. decanting said ammonium salt solution from said treated calcined catalyst, and j. calcining said catalyst in air at a temperature of about 480° C. to about 600° C.

2. The method claim 1 wherein the temperature of said first heat treatment of step g, is from about 375° C. to about 600° C.

3. The method of claim 1 wherein the potassium salt of one or more of step a, step c, and step e, is potassium nitrate.

4. The method of claim 1 wherein the ammonium salt is ammonium nitrate.

5. The method of claim 3 wherein the ammonium salt is ammonium nitrate.

6. The method of claim 1 wherein the atmosphere of said first heat treatment of step g, is substantially pure nitrogen.

7. The method of claim 6 wherein the atmosphere of said second heat treatment of step g, is air.

* * * * *